ary Examiner—Edward G. Whitby
United States Patent [19]
Wolinski et al.

[11] 3,864,181
[45] Feb. 4, 1975

[54] POLYMER FOAM COMPOSITIONS

[75] Inventors: Leon E. Wolinski, Cheektowaga; Arthur R. Endress, Hamburg, both of N.Y.

[73] Assignee: Pratt & Lambert, Inc., Buffalo, N.Y.

[22] Filed: Mar. 19, 1973

[21] Appl. No.: 342,744

Related U.S. Application Data

[60] Division of Ser. No. 259,656, June 5, 1972, , which is a continuation-in-part of Ser. No. 122,086, March 8, 1971, abandoned.

[52] U.S. Cl. ........................ 156/79, 53/29, 117/26, 156/204, 156/268, 161/160, 161/161, 161/DIG. 5, 260/2.5 BE, 264/45, 277/235 B, 285/DIG. 11
[51] Int. Cl. ............................................. B32B 31/14
[58] Field of Search ........ 156/204, 79, 268; 117/26; 264/45; 461/161; 161/DIG. 5, 160; 285/DIG. 11, 277/235 B, 53/29

[56] References Cited
UNITED STATES PATENTS

| | | | |
|---|---|---|---|
| 2,797,201 | 6/1957 | Veaten et al. | 260/2.5 B |
| 2,862,834 | 12/1958 | Hiler | 260/2.5 B |
| 3,230,184 | 1/1966 | Alford | 260/2.5 B |
| 3,615,972 | 10/1971 | Morehouse | 156/79 |
| 3,684,636 | 8/1972 | Rothrock et al. | 156/204 X |

*Primary Examiner*—Edward G. Whitby
*Attorney, Agent, or Firm*—Christel & Bean

[57] ABSTRACT

A composition and method for forming foamed polymers is provided. The compositions comprise a dispersion of microspheres in a solution of the polymer in a solvent. The compositions are applied to substrate, dried, and heated to expand the microspheres, thus formong a foamed polymer.

20 Claims, No Drawings

POLYMER FOAM COMPOSITIONS

This is a division of application Ser. No. 259,656, filed June 5, 1972; which is a continuation-in-part of applicant's copending application, Ser. No. 122,086, filed Mar. 8, 1971, now abandoned.

The present invention relates to a foamable polymer coating composition, and more particularly to polymer coating compositions which can be foamed and expanded at any convenient point during manufacture or use. Still more particularly, it relates to polymer coating solutions which can be employed in any conventional coating process, such as spraying, brushing, printing, dip coating and the like, and can be subsequently foamed and expanded in situ, either in selected areas or in toto. The present invention also relates to a method of forming foamed and expanded polymer coatings by conventional coating technique utilizing liquid polymeric coating solutions wherein the coating is foamed and expanded in situ at any convenient point after the coating is applied. The invention also relates to coatings of foamed polymeric materials formed in accordance with the process composition of the present invention.

Foamed polymer compositions are widely employed in a number of contexts for their ability to absorb mechanical, electrical, thermal and acoustical energy, their low density, their particular surface characteristics of texture and non-skid and non-abrasive surfaces and for their unusual appearance. For example, polymer foams are frequently applied to metals, such as metal furniture, automobile doors and other panels, metal roofs, heating and cooling ducts, office machines, containers and the like, to reduce noise. In addition, polymer foams are often employed as thermal insulation on heating and cooling ducts, hot and cold drink cups and similar food containers, refrigerator insulation and the like. Light-weight encapsulating formulations for potting electrical components and the like often rely upon electrically resistant polymer foams. The absorption of mechanical shocks and the like is an important area for the usage of foamed polymers in packaging of fragile materials such as for example, eggs, electrical components, light bulbs, optical instruments, jewelry, fruits and vegetables, glassware, ceramics, and many other materials. The particular surface characteristics of foamed polymers have been utilized in non-skid coatings for carpets, rugs, bathtub mats, flooring, coat hangers, handles for tools and athletic equipment such as baseball bats and tennis rackets and the like. The low density of foamed plastics has been utilized for flotation for boats, floating piers and docks, flotation apparel and life jackets, and as low density fillers for construction materials such as bricks, concrete blocks and structures and the like. The particular features of the appearance of foamed polymers have been employed for decorative effects, such as soft three-dimensional raised surfaces. Examples are Landau tops of automobiles, Christmas ornaments, synthetic leather materials and the like.

It is clear that the foamed polymer compositions are of substantial importance and have found wide usage in industry in many and diverse contexts. There are, however, serious limitations on the employment of foamed polymers and not all areas where such materials would be desirable have been developed. In addition, the technology of foamed polymer compositions is complex, expensive and very time consuming. A considerable amount of manipulation is required, frequently also requiring substantial amounts of hand labor. Normally foamed polymer materials are available as solid, foamed sheets or blocks often laminated with an adhesive to a backing such as paper board, metal sheets or metal foils. The sheets or other form of foamed polymeric material require extensive cutting and shaping to meet the requirements of usage, and then must be fastened in place by the use of laminating adhesives or the like. Much time, fabricating space, specialized equipment and labor is required for such operations and except in the highest volume operations, substantial hand labor is required. In addition, much wastage results from shaping operations. The employment of adhesives to laminate foamed materials to a substrate not only requires additional expensive materials and labor, but also presents problems of quality control and product uniformity. The bulk of foamed polymers require substantial space for storage and shipping facilities as well.

Many attempts have been made to improve the state of the art but these have met with limited success at best. For example, it has been proposed to polymerize in situ from "prepolymers" containing blowing agents. Such procedures have been employed in some contexts but generally require extensive investments in equipment and specialized labor and are subject to substantial variations in product quality. Such procedures are also relatively slow and are not generally applicable to all needs, and are basically limited to the preparation of substantially large and monolithic forms such as cushions, low density flotation and the like. Even there, such foaming techniques require molds and the process is not generally suitable for forming coatings.

Another attempt to improve the state of the art entails the formation of a laminated sheet of a foamable polymer composition layer and an adhesive layer with strippable facing layers over both the foamable polymer and the adhesive. The composite is cut to the desired shape and laminated to a substrate by removing the facing layer from the adhesive layer, then pressing the shaped composite into place. the foamable polymer is then foamed and the remaining facing layer is stripped off. Foaming is accomplished by heating, which may also serve to bind the adhesive to the substrate. The foamable polymer which enables the technique is a thermoplastic material in the form of small expanded particles which encapsulate a thermally activated blowing agent dispersed in a minor amount. Such materials are known to the art and are disclosed for example, in Belgian Pat. No. 641,711 and are available in commerce from the Dow Chemical Company of Midland, Michigan. The techniques employing the so-called "microspheres" have a number of advantages over more conventional technology since the bulk of the materials is substantially less prior to foaming and the provision of a preformed laminate of the adhesive component greatly facilitates operations. However, the technique still requires substantial manipulation with consequent high cost for labor and equipment. In addition, the materials are more expensive and limitations upon the areas of utilization of foamed polymers is not changed.

Another employment of the microspheres has been to incorporate them in aqueous emulsion or "latex" type coating compositions which can be employed as conventional coating compositions. After the coating has dried, the microspheres can be expanded by the application of heat, thus also expanding the coating. Such latex coatings are substantially limited, however, in the choice of polymers which can be effectively employed since many desirable polymers cannot be formed into useful aqueous emulsions or lack sufficient cohesion or adhesion to form adequate coatings from aqueous emulsions. In addition, the use of water based systems requires excessive drying periods for the removal of the water which makes such coatings unsuitable for numerous applications. In addition such latexes are not readily prepared, and as a consequence, must be obtained by the user in emulsified form with a substantial burden of the bulk and weight of the water.

It has long been a desire of those skilled in the art to simplify foamed polymer technology and to provide reliable and economical means for applying foamed polymer coatings and adhesives to substrate from solutions. It is accordingly an object of the present invention to provide foamable polymer solution coating and adhesive compositions and a method of applying foamable polymer coatings and adhesives from solution by simplified, reliable and economical techniques. It is a further object of the present invention to provide foamed polymer coatings and adhesives by such techniques. These and still other objects are realized by the present invention, of which the following is a full disclosure.

It has now been found that substantially any thermoplastic coating or adhesive polymer can be formulated into a liquid coating or adhesive solution, coated on a substrate, and subsequently foamed in situ, by incorporating into said liquid coating solution about 0.25–45 weight percent, based on the weight of the thermoplastic coating polymer, of microspheres, as described above and hereinafter more fully described, drying the coating, and thereafter heating the coating at a temperature sufficient to soften said thermoplastic coating polymer and activate the blowing agent contained in said microspheres. The temperatures of the foaming step will ordinarily be in the range of from about 175° to 485°F., preferably about 190° to 250°F., and the heating step can be accomplished at any convenient time after the coating is formed. The temperature and length of heating can be manipulated to attain either an open cell or a closed cell foam as desired. The density of the coating can be reduced by any desired degree to as little as 0.001 in the case of open cell structures and 0.01 for closed cell structures. The volume of the coating is increased in comparable fashion up to as much as 500 volumes for an open cell and 60–70 volumes for a closed cell.

Substantially any natural or synthetic thermoplastic polymer can be employed in the process of the present invention, including also thermally cross-linkable or thermosettable polymers which react at foaming temperatures to a cross-linked or thermo-set condition. As examples of foamable thermoplastic coating polymers, there can be mentioned polymers of ethylenically unsaturated monomers, such as polyethylene, polypropylene, polybutenes, polystyrene, poly($\alpha$-methyl styrene), polyvinyl chloride, polyvinyl acetate, polymethyl methacrylate, polyethyl acrylate, polyacrylonitrile and the like; copolymers of ethylenically unsaturated monomers such as copolymers of ethylene and propylene, ethylene and styrene, and polyvinyl acetate, styrene and maleic anhydride, styrene and methyl methacrylate, styrene and ethyl acrylate, styrene and acrylonitrile, methyl methacrylate and ethyl acrylate, methyl methacrylate and acrylonitrile and the like; polymers and copolymers of conjugated dienes such as polybutadiene, polyisoprene, polychloroprene, styrene-butadiene rubber, ethylene-propylene-diene rubber, acrylonitrile-styrene-butadiene rubber and the like; saturated and unsaturated polyesters including alkyds and other polyesters; nylons and other polyamides; polycarbonates; polyethers; polyurethanes; epoxies; urea-formaldehydes, phenol-formaldehydes and the like. In addition, such polymers can be formulated with curing or cross-linking agents activated at foaming temperatures to provide foamed, cured or cross-linked variations of the foregoing types of polymers. Such curing and cross-linking techniques are well known in the art and include for example, the use of free radical generators such as peroxides and the like, compounds reactive with double bonds such as sulfur and the like, or compounds reactive with pendant groups on the polymer chains such as the the reaction of polyisocyanates with pendant hydroxyl groups, the reaction of polyols with pendant isocyanate groups and the like. In addition, the foamable polymer can also be a thermoset material stabilized at a preliminary stage of polymerization and still deformable at elevated temperatures. Examples include epoxy polymers, phenol-formaldehyes, urea-formaldehydes, melamine-formaldehydes and the like, which further react at the foaming temperature to a thermoset condition.

The compositions of the present invention are formed by providing the coating or adhesive polymer and microspheres in a liquid solvent for the polymer together with other conventional ingredients of coating compositions. The liquid medium is a solvent for the polymer but must be a non-solvent, or at least have limited solvent activity for the microspheres. The microspheres are readily wetted by organic solvents and are of particle sizes which make them readily and stably dispersible. In circumstances where it is necessary to use a solvent having a more substantial solvent activity for the microspheres, by virtue of the character of the coating polymer or the contemplated utilization of the coating solution, it is possible to treat the microspheres to reduce or eliminate their solubility in the solvent required. A number of techniques are available. Among the simplest of these is a technique useful when the solvent of choice has a definite, but not great, solvent activity. The microspheres can be coated with a material which preferentially wets the surface of the microspheres but which is a non-solvent. Butyl alcohols, particularly n-butyl alcohol, are often useful for such a purpose. In more extreme circumstances, such as when a strong solvent for the material of the microspheres is employed or when long shelf life coating solution is required, more extensive treatments are required. In such contexts it has been found useful to coat the microspheres with a diverse polymer which is not soluble in the contemplated solvent and which will readily wet when in solution and coat the microspheres. Among the polymers which can be effectively employed in such a context are for example, acrylics, polyesters, alkyds, polyamides, cross-linked epoxies, ureaformaldehydes and phenol formaldehydes. Accordingly, by virtue of such techniques, there are substantially no restrictions upon the solvents which can be employed in conjunction with the microspheres. For substantially any solvent the microspheres can be used alone, preferentially wetted as with butyl alcohol, or coated with a polymer insoluble in the solvent. Among the solvents which can be employed without resort to preferential wetting or coating of microspheres there can be mentioned for example, water, alkanes, preferably straight chain alkanes, aliphatic alcohols, preferably straight chain aliphatic alcohols, and aromatics, preferably those with short-chain aliphatic substituents on the ring, e.g., toluene, xylenes and the like and mixtures of the above.

The microspheres employed in the present invention are hollow thermoplastic particles and are of relatively small size, usually less than about 200 to 300 microns in diameter and can be as small as about 0.5 microns in diameter. Preferably micron diameters of from about 3 to 50, and more preferably about 5 to 20, are employed. The microspheres have a generally spherical shape and define a generally concentric spherical cavity inside containing about 5 to 50 weight percent of a volatile blowing agent, insoluble or at most only slightly soluble in the thermoplastic material of the microsphere. Microspheres of such character can be prepared with bulk densities ranging from about 50 to 90 pounds per cubic foot. The thermoplastic of the microspheres can be generally any thermoplastic polymer but if the formation of a solution coating composition is contemplated, the thermoplastic of the microspheres should be different from the foamable coating polymer and not soluble in the solvent. Hence, in varying contexts, the thermoplastic of the microspheres can be chosen from among the same polymers disclosed as suitable for the foamable coating polymer.

The microspheres can be conveniently prepared by the techniques referred to as a "limited coalescence" polymerization technique. A typical preparation of such particles is as follows:

A polymerization reactor equipped with an agitator is charged with 100 parts by weight of deionized water and 15 parts by weight of a 30 weight percent colloidal silica dispersion in water. The colloidal silica dispersion is 30 weight percent solids and is available under the tradename of "Ludox HS." To this mixture is added 2.5 parts by weight of a 10 percent aqueous solution of a copolymer prepared from diethanol amine and adipic acid in equimolar proportions by carrying out a condensation reaction to give a product having a viscosity of about 100 centipoises at 25°C. One part by weight of a solution containing 2.5 weight percent potassium dichromate is added. The pH of the aqueous solution is adjusted to 4 with hydrochloric acid. Vinylidene chloride is utilized as the monomer. An oil phase mixture is prepared by utilizing 100 parts by weight of vinylidene chloride and 20 parts by weight neopentane (27.6 volume percent based on the total volume of the monomer-neopentane mixture) and 0.1 part by weight of benzoyl peroxide as a catalyst. The oil phase mixture is added to the water phase with violent agitation supplied by a blade rotating at a speed of about 10,000 rpm. The reactor is immediately sealed and portion sampled to determine the particle size. The droplets appear to have diameters of from 2 to about 10 microns. After the initial disperson, the reaction mixtures are maintained at a temperature of about 80°C. for a period of 24 hours. At the end of this period, the temperature is lowered and the reaction mixture is found to have the appearance of a white, milky liquid similar to a chalk-white milk. A portion of the mixture is filtered to remove the particles and the particles or beads are subsequently dried for about 1 hour in an air oven at the temperature of about 30°C. A portion of the dried spherical particles are heated in an air oven at a temperature of 150°C. for about 3 minutes. Upon heating, the particles show a marked increase in volume. Microscopic examination of the particles prior to foaming indicates particles having diameters of from about 2 to about 10 microns and having disposed therein a distinct spherical zone which appears to contain liquid and a small vapor space. The particles which are heated are examined microscopically and are found to have diameters of from about 2 to 5 times the diameter of the original particles and to have a relatively thin, transparent wall and a gaseous center, i.e. a monocell.

Preferred polymers for preparation of the microspheres are for example, polyvinylidene chloride, a copolymer of vinylidene chloride and acrylonitrile in weight ratios of about 100:1 to about 70:30, copolymers of acrylonitrile and methyl acrylate in weight ratios of about 90:10 to 80:20, and copolymers of methacrylonitrile and methyl acrylate in weight ratios of about 93:7 to 82:18. While these materials and proportions are preferred, it is not intended that the invention be limited thereto. The preference is grounded principally in convenience and not in any substantive considerations.

By utilizing the technique of limited coalescence, a wide variety of expandable thermoplastic microcellular particles can be prepared. Such materials are now familiar to the art and are commercially available as has been mentioned above, and for convenience are referred to generically hereinafter as microspheres. The microspheres have found wide usage in expanded form as additives to reduce bulk density of materials.

In the present invention the microspheres are formulated into coating or adhesive compositions in unexpanded form, coated upon a substrate and, as desired, subsequently heated to cause expansion. The major advantage of the technique of the present invention lies in the ability to employ conventional coating techniques such as spray painting, printing, dip coating and the like without resort to the cumbersome, timeconsuming and expensive procedures heretofore necessary with foamed polymers. In addition the coatings and adhesives of the present invention can be foamed at any time after the coating is applied, permitting reductions of bulk for storage and shipment until foaming is needed. The coatings can be foamed in selected areas to produce three-dimensional special effects such as raised designs, lettering and similar effects, by the simple expedient of selective application of heat. When employed as adhesives the compositions can be applied, dried to an initial set, and subsequently expanded to completely fill and effectively seal an entire volume. A further advantage is the ability to work, cut, print, emboss, crease, glue and stamp the coating prior to foaming using conventional techniques and equipment without need to resort to special modifications necessary with foamed materials.

The coating and adhesive compositions can be formulated with a wide diversity of modifying ingredients as is conventional in the art. Such additives can include for example, plasticizers, tackifiers, extenders, drying oils, reinforcing fillers, dyes, pigments, antioxidants, ultraviolet light stabilizers and screening agents, crosslinking and curing agents and the like. Such additives are well known in the art and form no part of the present inventon. As a matter of choice to the practitioner, these additives are specifically contemplated for inclusion in the compositions in conventional fashion for their known purposes and effects depending upon the intended context of usage of the foamed product.

The coating and adhesive compositions of the present invention are conveniently formulated, handled, applied and treated like any comparable conventional non-foaming coating or adhesive solution despite their foamable character. The intended mode of usage dictates the particular formulation of the composition but the composition can be readily applied to a substrate by virtually any convenient technique. The wide variety of coating techniques available for utilization with the compositions of the present invention can be exemplified by for example, spray painting, printing, dip coating and similar processes. Adhesive formulations can be applied by similar techniques or any other technique more convenient, such as trowling or the like or employing solutions of greater viscosity.

It should be noted that the properties of the foamed composition will be determined by the coating or adhesive polymer and will be little altered by the microspheres except in their functions as "foaming agents". Thus it will be apparent tha the properties of the foamed compositions can be tailored to the intended use without undue concern for the properties of the materials included in the preparation of the microspheres. In the properties contemplated in the present invention, the microspheres, both before and after expansion and irrespective of whether an open cell or closed cell foam is produced, will not be contiguous but rather will be a disperse phase in a continuous matrix of the coating or adhesive film-forming polymer.

While many variations of the present invention are contemplated, the considerable simplicity of the invention and its fundamental concepts enables those of ordinary skill to implement the practice of the invention with a minimum of guidance once the basic nature of the invention is clearly understood. It would, however, be informative to refer to the following specific examples which illustrate a few of the numerous facets of technology which can advantageously employ the present invention. These examples are intended to be illustrative only and should not be construed as limiting the scope of the invention, which is defined only by the appended claims.

EXAMPLE I

A polyamide coating solution in accordance with the present invention was repeated by combining in the specified proportions, the following materials:

| | | |
|---|---|---|
| aliphatic petroleum solvent | 20 | parts by weight |
| microspheres | 24.5 | |
| isopropyl alcohol | 15.0 | |
| pentaerythritol-resin ester | 7.0 | |
| glycerol-rosin ester | 3.0 | |
| polyamide resin | 20.0 | |

When all the components had dissolved except the microspheres, the composition was diluted to 100 parts by weight total by the addition of 10.5 additional parts by weight of the aliphatic petroleum solvent.

The aliphatic petroleum solvent was Lactol Spirits, a product of American Mineral Spirits Company, Palatine, Illinois. It had an initial boiling point of 206°F., a final boiling point of 217°F., a specific gravity at 60°F. of 0.7467, an aniline cloud point of 114.0°F. and contained 10.2 weight percent aromatics and olefins, 48.5 weight percent naphthenes and 41.3 weight percent paraffins.

The microspheres were from the Dow Chemical Company. The were of polyvinylidene chloride having an unexpanded particle size range of generally 8 to 20 $\mu$ and containing about 20 weight percent neopentane based on the weight of the polymer.

The isopropyl alcohol was a technical grade containing a minimum of 99.0 weight percent isopropanol, a specific gravity 20/20°C. of 0.785–0.787, and a distillation range of 81.5° to 83.0°C.

The pentaerythritol-rosin ester was Hercules Resin S-1475 leveling agent, having a softening point of 165°C. and an acid number of 206.

The glycerol-rosin ester was Crosby Chemicals, Inc. Lacros 1418, a maleic modified ester hard plasticizer having a melting point of 140°C. (Ring and Ball), a specific gravity of 1.14 at 25°C. and an acid number of 33.

The polyamide was Polymid 1211 from Krumbharr Resin Division, Lawter Chemicals. Inc. It had a color (Gardner 1933) of 6–7, an acid value of 3.6, melting point 91°C., an amine value of 4.8, specific gravity 0.98, viscosity E (40% NV, 70% toluene, 30% isopropanol).

The coating solution was coated onto a 20 mil solid bleached sulfite paper and air dried at 125°F. to give a 3 mil finished coating containing 36.70 weight percent polyamide, 18.35 weight percent resin and 44.95 weight percent microspheres.

Separate portions of the coated paper were then foamed by radiant heat, a hot metal surface and infrared light. Each was at 250°F. The coating expanded to about 15 mils and remained adherent to the paper.

EXAMPLE II

A portion of the coated paper of Example I was given a 1 mil overcoat of the composition which contained no microspheres and was air dried at 125°F. The composite coating was subjected to a heat treatment at 250°F. to foam the microspheres. The resultant foamed coating was about 16 mils thick and had a clear, hard, highly abrasion-resistant surface. The foam coated paper could be readily cut and creased and could be effectively printed by a printing press.

EXAMPLE III

A portion of the coated paper of Example I was coated with an overlay as in Example II. The unfoamed coating was printed in a printing press and then foamed at 250°F. The printing was not impaired.

EXAMPLE IV

Another portion of the coated paper of Example I was given an overlay coating as in Example II. The unfoamed coating was gold leaf stamped in a heated platen stamping machine. A sharply defined raised pattern stamped in gold resulted.

EXAMPLE V

A coated paper prepared in accordance with Example I was cut and creased to form a carton blank. The overlapping edges of the carton were additionally coated with a 2 mil layer of a heat-sealing blend of 28 weight percent of a copolymer of ethylene and vinyl acetate (Elvax 40, a product of DuPont containing 39 to 42% vinyl acetate and having a melt index of 45 to 70 grams); 7.6 weight percent of a paraffin wax having a melting point of 125 to 127°F; 26.6 weight percent of a modified terpene phenolic resin; and 3.80 weight percent microspheres. When the carton was folded and heated, the coatings were expanded and sealed into the defined shape.

EXAMPLE VI

Another polyamide based coating formulation was prepared by combining the following ingredients in the stated proportions:

| | | |
|---|---|---|
| aliphatic petroleum solvent | 20 | parts by weight |
| microspheres | 15.0 | |
| isopropyl alcohol | 15.0 | |
| pentaerythritol-rosin ester | 7.0 | |
| glycerol-rosin ester | 3.0 | |
| polyamide | 20.0 | |

The solution was brought up to a total of 100 parts by dilution with 20.0 parts by weight additional petroleum solvent. The solution was coated on a 7 mil Saran polyvinylidene chloride film and air dried at 125°F. to form a 3 mil coating. The coated film was passed through an oven at 250°F. whereupon the coating foamed to 9 mils thickness. The resultant coating was soft and flexible and afforded a pleasing tactile stimulus. When employed as a wrap for tomatoes, the coating afforded substantial protection from physical abuse and temperature changes.

EXAMPLE VII

A polyamide coating solution was formed of:

| | | |
|---|---|---|
| aliphatic petroleum solvent | 20 | parts by weight |
| microspheres | 17.5 | |
| polyamide | 31.0 | |
| pentaerythritol-rosin ester | 5.0 | |
| isopropyl alcohol | 22.0 | |

The solution was diluted to a total of 100 parts with 4.5 parts by weight petroleum solvent.

A. The solution was spray coated onto a 10 mil aluminum foil and air dried at 125°F. to provide a 6 mil coating. The unfoamed coating was strongly adherent. When foamed at 250°F., the coating foamed to 50 mils and still retained its adhesion. The foam coated foil was found useful for decorative coatings and as padding for cartons and like containers.

B. The solution was coated on a bleached sulfite paper of 20 mils. After drying at 125°F. and foaming at 250°F., to 50 mils, the resultant foam coated paper was used to form cylindrical hollow rolls in which cookies were packed in a "stack-pack" fashion. The cookies were found far less susceptible to breakage when compared in similar packaging with corrugated paper rolls.

C. The solution was sprayed onto a 100 watt light bulb, dried at 125°F. and foamed at 250°F. to 50 mils. The light bulb so coated provided a soft diffused light and was dropped from a height of about 10 feet onto a hardwood floor a number of times without damage.

EXAMPLE VIII

An ethylene-vinyl acetate copolymer based coating solution was prepared to the following formulation:

| | |
|---|---|
| microspheres | 15.0 |
| E.V.A. copolymer | 11.0 |
| terpene-phenolic resin | 6.5 |
| modified phenolic resin | 4.0 |
| paraffin wax | 3.0 |
| toluene | 35.5 |
| aliphatic petroleum solvent | 25.0 |

The ethylene-vinyl acetate copolymer was DuPont's Elvax 40, hereinbefore described. The modified phenolic resin was Union Camp Corporation's Unirez 9002 having a melting point of 128°–138°C. (Ring and Ball) and an acid number of 10–20. The paraffin wax had a melting point of 125°–127°F.

The composition was employed to coat 20 mil bleached sulfite paper as in Example I and proved to have similar properties when dried and foamed.

EXAMPLE IX

A cross-linked acrylic polymer based foamable coating formulation was prepared from the following:

| | | |
|---|---|---|
| microspheres | 15.0 | parts by weight |
| aliphatic petroleum solvent | 15.0 | |
| isopropyl alcohol | 20.0 | |
| toluene | 8.4 | |
| maleic anhydride | 0.1 | |
| acrylic polymer | 35.0 | |
| hexamethoxymethylmelamine | 2.5 | |
| pentaerythritol-rosin ester | 2.0 | |
| glycerol-rosin ester | 2.0 | |

The acrylic polymer was obtained from Union Carbide and contained pendant hydrocarbyl and carboxylic acid groups. It is designated LSKA 0900 and has a molecular weight of from about 200,000 to 500,000.

The solution was mixed with p-toluene sulfonic acid (50% in isopropyl alcohol) as a catalyst for the cross-linking reaction in an amount of about 8 oz. per gallon. It was sprayed, dried and foamed onto 20 mil bleached sulfite paper as in Example I and proved to have similar properties.

EXAMPLE X

A solution was formed of 25 weight percent microspheres dispersed in a 40 weight percent hexane solution of Epon 828 and Epon U in a weight ratio of 10:3. The solution was sprayed onto cheese cloth, air dried at 125°F. and foamed to 60 mils at 250°F., whereupon the epoxy resin cured. The coating was soft and flexible, adhered well to the cloth and could be dry cleaned.

EXAMPLE XI

A gasket was prepared by applying a solution of the following formulation to parts to be joined:

| | | |
|---|---|---|
| n-propanol | 19.00 | parts by weight |
| methylene dichloride | 9.50 | |
| castor oil | 11.95 | |
| asbestos filler | 14.85 | |
| silica filler | 4.00 | |
| extender oil | 27.25 | |
| alkyd resin | 12.15 | |
| cobalt octanoate | 0.10 | |
| manganese napthenate | 0.60 | |
| lead octanoate | 0.60 | |
| microspheres | 15.00 | |

The alkyd resin was Rohm and Haas Duraplex AL-210C. The extender oil was Baker Chemicals H40. The asbestos was Asbestine 5X and the silica was Cab-O-Sil M-5.

Upon joining the coated surfaces, a tough adhesive bond was formed. When heated to 250°F. the joint expanded. While an excellent seal was maintained, when the joint was released the gasket was readily strippable therefrom.

EXAMPLE XII

A vinyl based gasket was prepared from the following formulation:

| | |
|---|---|
| toluene | 53.75 parts by weight |
| polyvinyl chloride | 15.20 |
| s-amyl acetate | 4.00 |
| 2-nitropropane | 12.50 |
| dioctyl phthalate | 1.63 |
| white oil | 2.80 |
| $T_iO_2$ | 9.72 |
| propylene oxide | 0.40 |
| microspheres | 15.00 |

The coating was sprayed on the faces of the cylinder head and block of an automobile engine. The surfaces were mated and lightly fastened in place without torquing to specifications. The engine was operated for about one-half hour and the head bolts were then torqued to specification. An excellent seal resulted. After about one week of intermittent use in normal operation, the head was removed. The gasket material was readily strippable.

The foregoing examples are presented to clearly illustrate and emphasize the nature and operation of the present invention, and accordingly should not be construed as definitive or limiting upon the scope of the invention which is defined only in the following appended claims.

What is claimed is:

1. A method of making a shock absorbing package comprising forming a coating composition of a solution of a film-forming polymer in a solvent therefor, having dispersed in said solution about 0.25 to 45.0 weight percent, based on the weight of said film-forming polymer, of thermally expandable thermoplastic microspheres, applying said coating composition to a paper based substrate, drying the coated substrate to remove the solvent from the coating composition, cutting and creasing the coated substrate to form a package blank, wherein said blank includes edges to be overlapped, applying to the edges to be overlapped an adhesive, folding said blank to form a package, adhesively bonding the overlapping edges, and heating to expand the microspheres.

2. The method of claim 1 wherein said microspheres are insoluble in said solvent.

3. The method of claim 1 wherein said microspheres are coated with a compound which preferentially wets the surface thereof.

4. The method of claim 3 wherein said compound is an aliphatic alcohol.

5. The method of claim 4 wherein said alcohol is n-butyl alcohol.

6. The method of claim 1 wherein said microspheres are soluble in said solvent and are coated with a material insoluble in said solvent.

7. The method of claim 6 wherein said material is selected from the group consisting of polyamides, epoxies, ureaformaldehydes and phenol formaldehydes.

8. The method of claim 1 wherein said polymer is a coating polymer.

9. The method of claim 1 wherein said polymer is an adhesive polymer.

10. The method of claim 1 wherein said solvent is selected from water, alkanes, aromatics and aliphatic alcohols.

11. A method of forming in situ a gasket between two opposing surfaces comprising forming a coating composition of a solution of a film-forming polymer in a solvent therefor, having dispersed in said solution about 0.25 to 45.0 weight percent, based on the weight of said film-forming polymer, of thermally expanded thermoplastic microspheres, applying said coating composition to a first one of said opposing surfaces, drying the coated surface to remove the solvent from the coating composition, joining said first surface coated with the said coating composition and the second said opposing surface, and heating to expand the microspheres.

12. The method of claim 11 wherein said microspheres are insoluble in said solvent.

13. The method of claim 11 wherein said microspheres are coated with a compound which preferentially wets the surface thereof.

14. The method of claim 13 wherein said compound is an aliphatic alcohol.

15. The method of claim 14 wherein said alcohol is n-butyl alcohol.

16. The method of claim 11 wherein said microspheres are soluble in said solvent and are coated with a material insoluble in said solvent.

17. The method of claim 6 wherein said material is selected from the group consisting of polyamides, epoxies, ureaformaldehydes and phenols formaldehydes.

18. The method of claim 11 wherein said polymer is a coating polymer.

19. The method of claim 11 wherein said polymer is an adhesive polymer.

20. The method of claim 11 wherein said solvent is selected from water, alkanes, aromatics and aliphatic alcohols.

* * * * *